United States Patent [19]
Donhoff et al.

[11] Patent Number: 5,922,277
[45] Date of Patent: Jul. 13, 1999

[54] RECYCLING SYSTEM FOR HAZARDOUS WASTE DISPOSAL

[76] Inventors: Ron Donhoff, 424 Story Pl., Alhambra, Calif. 91801; Thomas W. Robertson, 2230 Roseglen Ave., San Pedro, Calif. 90731; Richard Marshall, 11205 Bobcat La., Arroyo Grande, Calif. 93420

[21] Appl. No.: 08/898,706

[22] Filed: Jul. 22, 1997

[51] Int. Cl.[6] ........................................ B03B 9/00
[52] U.S. Cl. .................................. 422/1; 209/2; 209/18; 210/751; 210/767; 210/768; 210/770; 422/31; 422/32; 588/18
[58] Field of Search .................................... 210/751, 912; 422/1, 31, 32, 261, 292, 309; 588/18

[56] References Cited

U.S. PATENT DOCUMENTS

| | | |
|---|---|---|
| 1,778,831 | 10/1930 | Jones . |
| 1,791,473 | 2/1931 | Grisbaum . |
| 3,953,306 | 4/1976 | Lancy . |
| 4,392,941 | 7/1983 | Roth et al. ........................... 208/11 LE |
| 4,889,640 | 12/1989 | Stanforth ................................. 210/751 |
| 4,931,192 | 6/1990 | Covington et al. ..................... 210/751 |
| 5,092,983 | 3/1992 | Eppig et al. ............................ 208/323 |
| 5,195,847 | 3/1993 | Guymon ................................. 405/128 |
| 5,213,624 | 5/1993 | Williams ................................. 134/40 |
| 5,268,128 | 12/1993 | Lahoda et al. .......................... 252/626 |
| 5,269,906 | 12/1993 | Reynolds et al. ....................... 208/13 |
| 5,527,486 | 6/1996 | De Guertechin ........................ 252/162 |
| 5,556,548 | 9/1996 | Mellen ..................................... 210/806 |

Primary Examiner—Krisanne Thornton
Attorney, Agent, or Firm—Zackery, Furrer & Tezak

[57] ABSTRACT

A recycling system treats petrochemical types of hazardous waste for disposal. Such waste typically includes in large part, a mixture of hydrocarbons, water, solids (soil particulate), and metals. The recycling system separates the water, solids, hydrocarbons, and metals from one another. The recycling system includes the following processing steps:

(1) mixing the hazardous waste with a water-miscible washing medium, and agitating the mixture for separating water and some hydrocarbons from solids;

(2) removing hydrocarbons from solids by mixing the solid/hydrocarbons with a washing medium that is nonmiscible with water, and agitating the mixture for dissolving hydrocarbons in the solids;

(3) removing metals from the separated solids by mixing the separated solids with an acidic washing medium, and agitating the mixture for dissolving metals from the separated solids into liquid solution; and (4) subjecting the separated solids to an alkaline washing solution for neutralizing acidity in the separated solids, and thereafter drying the separated solids for removal of moisture for disposal of the separated solids.

Processing in accordance with the invention, provides separated water and soil particulate substantially free of contamination by hydrocarbons and/or toxic/RCRA metals, and thus may be reintroduced into the environment, the water sewered, and the metals recycled.

20 Claims, 4 Drawing Sheets

RECYCLING SYSTEM FOR HAZARDOUS WASTE DISPOSAL

FIELD OF THE INVENTION

The present invention relates generally to a recycling system treating hazardous wastes for disposal, and in particular, to a recycling system for treating petrochemical types of hazardous wastes for disposal.

BACKGROUND OF THE INVENTION

The petroleum and chemical industries have a serious problem. Namely, manufacturing processes in these industries produce large amounts of waste that is toxic and hazardous. Harmful ingredients in the waste generally do not break down over time in the environment. That is, the waste remains harmful indefinitely. Contamination of soil, air or water by small amounts of this waste can result in disastrous environmental consequences. To date, no completely satisfactory solution has been found for disposing of such waste.

One attempted solution to hazardous waste disposal has been to simply store the waste. However, the petroleum and chemical industries in the U.S. alone, produce hundreds of thousands of tons of such waste annually. Therefore, storage sites must be continuously located as previous storage sites fill. Since the waste essentially does not breakdown over time, storage sites must be carefully maintained, indefinitely, to protect against escape of the waste into the environment. In an increasingly urbanized world, clearly, a major problem with storage as a solution for disposing of hazardous waste is a lack of suitable storage space.

Another attempted solution has been the processing of hazardous waste to eliminate its harmful effects. Such processing generally involves burning hazardous waste at high temperature to reduce it to fine ash. The high temperature thoroughly oxidizes the waste and renders it nonharmful to a level suitable for disposal in a landfill. One main drawback to this solution, is that the high temperature burning generally requires significant expenditure of fossil fuels, and is thus expensive. Burning of fossil fuels also results in carbon dioxide emissions, a gas that has been increasing in accumulation in the atmosphere, and there is significant concern that the carbon dioxide accumulation will have adverse environmental impacts. Additionally, the burning typically emits other gases and pollutants that can harm the environment as well.

In the petroleum and chemical industries, manufacturing processes frequently result in hazardous wastes of crude oil and other chemical compounds contaminating tanks and other equipment. The wastes include in large part, a mixture of hydrocarbons, water, and soil particulate. The waste also typically includes metals, defined as toxic and/or hazardous under the U.S. Resource Conservation and Recovery Act ("RCRA"). Water and soil particulate usually forms the majority portion by volume in the wastes, and are bound with the hydrocarbons and metals in a gelatinous residue. In the oil and chemical industries, this residue is generally referred to as "sludge."

Attempts have been made to recycle sludge. The recycling process typically involves centrifuging the sludge to separate a liquid mixture of hydrocarbons and water, from thicker, more solid material, such as soil particulate. Known processing techniques can thereafter be applied to the liquid mixture to separate hydrocarbons from water. Separated hydrocarbons are generally recycled as a commercially valuable product. Water separated from hydrocarbons, and other contaminants, is considered to be nonhazardous, and is appropriately disposed of, i.e., sewered.

There are three main problems with recycling sludge, however. First, the processing techniques for separating hydrocarbons from water can be costly. Second, these processing techniques often involve using environmentally hazardous chemicals to separate hydrocarbons that are mixed with water. For example, U.S. Pat. No. 5,092,983 teaches using solvents, preferably n-pentane and toluene, for dissolving and separating hydrocarbons from water. Both solvents can be environmentally hazardous.

Third, and perhaps most importantly, no suitable processing techniques have been identified for removing toxic metals from sludge. More particularly, before soil particulate can be rendered nonhazardous, and appropriately disposed of, such as in a landfill, all toxic metals must be substantially removed. Metals remaining in fill soil frequently contaminate the environment due to leaching, with catastrophic environmental consequences. The difficulty in separating metals is most likely due to complex bonds that form between metals and hydrocarbons.

Rather than removing toxic metals when recycling sludge, proposals have been made to leave metals mixed with soil particulate, after treating the soil to inhibit leaching. Referring to U.S. Pat. No. 5,092,983 again, this patent teaches treating solids produced by the disclosed recycling process, with fixation chemicals to prevent leaching, rather than removing the metals. Thereafter, the treated solids are disposed of in a landfill. U.S. Pat. No. 5,269,906 discloses mixing an alkaline material (preferably calcium oxide) with sludge to reduce toxic leachability of nickel metal in the sludge, rather than removing the nickel.

While fixation techniques may inhibit leaching, there is still a significant danger of environmental contamination, especially over the long-term, from toxic metal leaching. A better solution is to ensure against environmental contamination by removing toxic metals before disposing of solid particulate.

The present invention provides an improved recycling solution for addressing the problem of hazardous waste disposal.

SUMMARY OF THE INVENTION

The present invention provides a recycling system for treating petrochemical types of hazardous waste for disposal. The recycling system separates the water, solids, hydrocarbons, and toxic/RCRA metals from one another. Separated hydrocarbons are preferably recycled as a commercially valuable product. Separated metals are preferably bound with other chemicals to form nontoxic chemical compounds such as salts, oxides, sulfates, and silicates. Separated water and soil particulate is substantially free of contamination by hydrocarbons and/or toxic metals, and thus may be appropriately disposed of. For example, the water may be sewered, and the soil particulate disposed of in a landfill or used for fill, the same as regular dirt.

Processing in accordance with the recycling system includes these steps:

(1) mixing the hazardous waste with a water-miscible washing medium, and agitating the mixture for solubizing solids and separating solids from the hazardous waste;

(2) removing hydrocarbons from dewatered solids by mixing the separated solids and toxic/RCRA metals with a washing medium that is nonmiscible with water, and agitating the mixture for dissolving hydrocarbons from the solids, and relaxing the toxic/RCRA metals;

(3) removing toxic/RCRA metals from the separated solids by mixing the separated solids with an acidic washing medium, to solubize the toxic/RCRA metals, and agitating the mixture for dissolving metals from the separated solids into liquid solution; and (4) subjecting the separated solids to an alkaline washing solution for neutralizing acidity in the separated solids, and thereafter drying the separated solids for removal of moisture for disposal of the separated solids.

Preferably, the water-miscible washing medium is composed of citric acid and other constituents, and the non-miscible washing medium is composed of d-limonene and other constituents. The acidic washing medium is preferably composed of sulfuric acid, and the alkaline washing solution is composed of sodium hydroxide.

In other aspects, the invention provides a recycling system for treating soil contaminated with petrochemical types of hazardous waste and/or toxic metals for disposal of the soil. In this regard, the recycling system includes removing hydrocarbons from the soil by mixing the soil with d-limonene, agitating the resulting mixture for dissolving hydrocarbons in the soil, and separating soil from liquid.

If the contamination includes toxic/RCRA metals, the following steps are additionally performed:

(1) mixing the soil with an acidic washing medium to form a mixture having a standard pH measurement of no greater than 2.5 for causing metals in the soil to dissolve;

(2) applying heat to ensure the mixture has a temperature of at least 200 degrees Fahrenheit for enhancing the dissolving of metals;

(3) agitating the mixture resulting from the step of heating for further enhancing the dissolving of metals; and (4) separating soil and liquid from one another in the mixture resulting from the heating and agitating steps, and thereafter subjecting separated soil to an alkaline washing solution for neutralizing acidity in the soil, and thereafter drying the soil for recycle.

The soil thus has toxic metals removed from it for recycle/disposal of the soil. The acidic washing medium is preferably composed of sulfuric acid for dissolving metals from the soil.

Dissolved metals may be captured in accordance with the invention by mixing a hydroxide solution with separated liquid in an amount sufficient to form an alkaline solution. Thereafter, a sulfate is mixed with the alkaline solution for causing dissolved metals in the solution to precipitate out of solution in the form of chemical compounds. Subsequently, the alkaline solution is filtered to remove the chemical compounds, and thus capture the metals. The hydroxide solution is preferably composed of sodium hydroxide, and the sulfate of ferrous sulfate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings. In this regard, FIGS. 1 through 4 schematically illustrate a preferred embodiment of a recycling system in accordance with the present invention, which includes four major processing steps.

DETAILED DESCRIPTION OF THE PREFERRED EMBODIMENTS

The present invention provides a recycling system for treating petrochemical types of hazardous waste for disposal. More particularly, the recycling system treats hazardous wastes that typically include in large part, a mixture of hydrocarbons, water, solids (soil particulate), and toxic/RCRA metals. Such waste frequently results as a byproduct of manufacturing processes in the petroleum and chemical industries, and is usually referred to as "sludge" in these industries. That is, a thick, gelatinous mixture, composed primarily of water and soil particulate bound with hydrocarbons and metals.

FIGS. 1–4 schematically illustrate a preferred embodiment of a recycling system in accordance with the present invention. The recycling system includes four major processing steps, which substantially function as follows:

(1) separating water and some hydrocarbons, with the primary focus being on separating water from solids;

(2) separating residual hydrocarbons from solids;

(3) separating metals from solids; and (4) neutralizing acidity in the solids.

Figure 1:
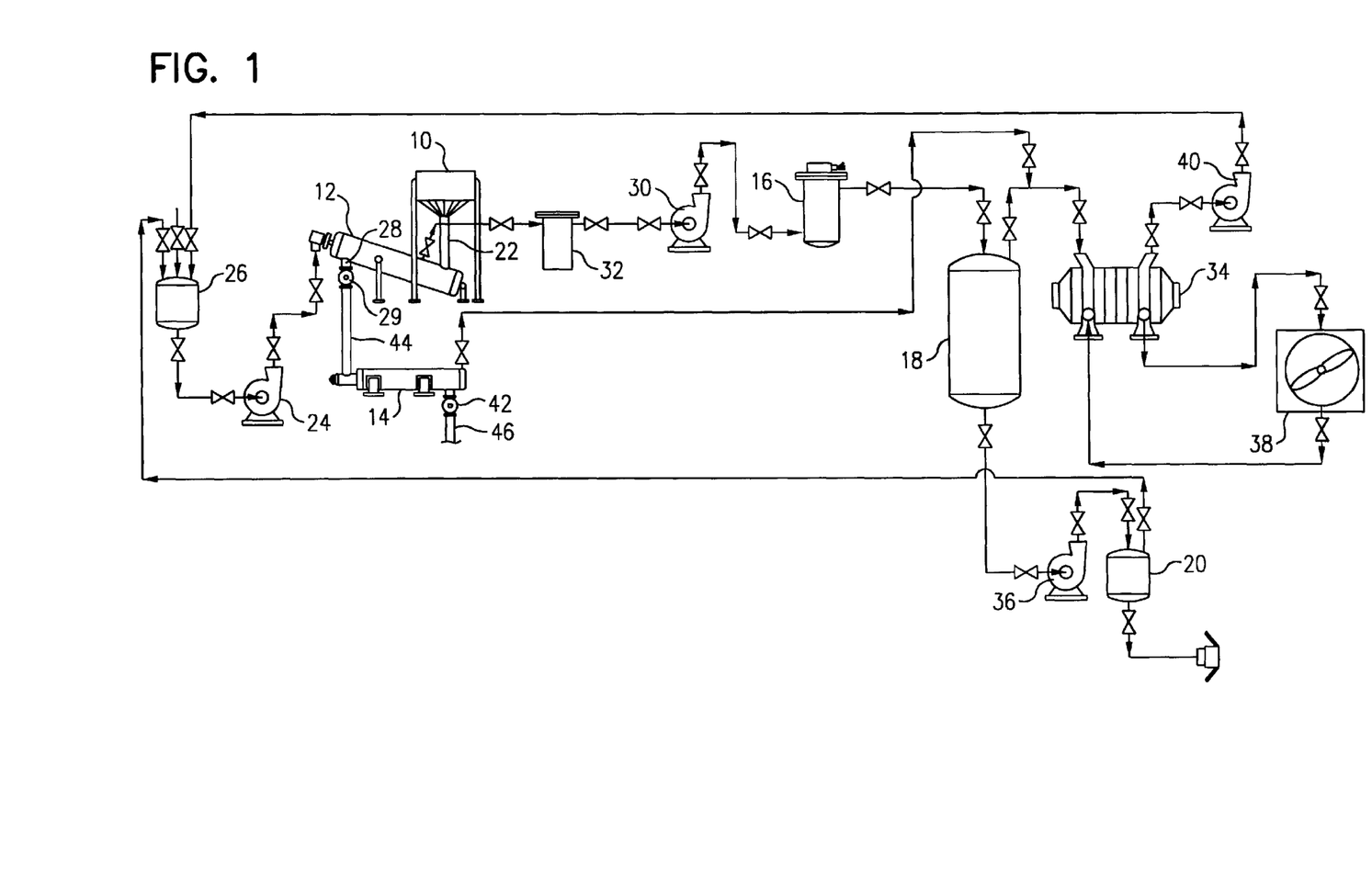
FIGS. 1 through 4 illustrate, respectively, apparatus for carrying out the first through fourth major processing steps of the preferred embodiment of the invention.

FIG. 1 illustrates apparatus for carrying out the first major processing step of the recycling system, i.e., separating water and hydrocarbons from solids. The principal components of the apparatus include a loading hopper 10, a washing mechanism or barrel 12, a drying mechanism or drum 14, an electric immersion heater 16, a vaporization vessel 18, and a recovered hydrocarbon vessel 20.

The recycling system receives waste to be treated for disposal in the loading hopper 10. The loading hopper 10 may receive the waste from a front-end loader, conveyor belt, screw conveyor, or any other known method. The loading hopper 10 corresponds generally in shape to a funnel, and receives waste in the larger diameter end of the funnel shape. Under the influence of gravity, the smaller diameter end of the loading hopper 10 directs the waste into the washing barrel 12. The loading hopper 10 may additionally include a screw conveyor, agitator, or other mechanism for injecting waste through the narrower end of the loading hopper into the washing barrel 12.

Alternatively, if the waste is stored in a closed tank or other form of closed storage container, the loading hopper 10 may be eliminated from the recycling system. In this alternative embodiment, the waste may be injected from the storage container directly into the washing barrel 12 using a screw conveyor or other mechanism.

The washing barrel 12 forms an enclosed, generally cylindrical shape, in which a negative pressure is maintained for preventing the escape of vapors. Waste enters the washing barrel 12 through a rotary valve 22 for controlling the flow rate of waste and maintaining the negative pressure in the washing barrel. The washing barrel 12 receives the waste and agitates the waste in a water-miscible washing mechanism using an internal agitation device. The water-miscible washing medium is preferably injected into the washing barrel 12 through channels in the agitation device.

The water-miscible washing medium is composed of citric acid (chemical formula $C_6H_8O_7$). More particularly, preferably a citric acid mixture sold under the trade name "PRO-500 Industrial Strength Cleaner-Degreaser," manufactured by, and available from, PRO-CHEM Specialty Products, Inc. of San Diego, Calif., is used for the washing medium. Suitable citric acid mixtures for the washing medium are also, for example, manufactured by, and available from Haarmann & Reimer of Elkhart, Ind., and from Dow Chemical.

A pump 24 injects the washing medium as needed into the washing barrel 12 from a closed storage container 26 holding the washing medium. The washing medium is preferably injected into the washing barrel 12 to achieve a mixture of washing medium and waste having a standard pH measurement in the range 7.5 to 8.5, with the pH being ideally about 8.0±0.2. The residence time of waste and washing medium mixture is controlled by employing conventional rotary valves.

Agitation of the waste with the washing medium causes solids to solubize and separate from the liquid fraction of the waste and washing-medium mixture. For enhancing the solubization process, heating is applied. Preferably, heating maintains the temperature of the mixture within the washing barrel 12 in the range of 130 to 150 degrees Fahrenheit, with the temperature ideally being maintained at about 140 degrees Fahrenheit. Proper temperature is preferably maintained by heating the washing medium prior to injection into the washing barrel 12, such that the resulting mixture is within the proper temperature range.

The agitation device preferably forms a shape corresponding generally to a screw conveyor, and is made from stainless steel for resistance to corrosive conditions. The agitation device coaxially mounts within the washing barrel 12 and rotates along its axis for mixing the washing medium with the waste. As can be seen from FIG. 1, the washing barrel 12 is inclined. Waste initially enters the lower end of the washing barrel 12, and rotation of the agitation device, due to the screw conveyor shape, carries separated solids to the upper end of the washing barrel 12. At the upper end of the washing barrel 12, the solids fall through a drop-out point 28 via gravity overflow for removal from the washing barrel 12 through a rotary valve 29.

Agitation also causes the washing medium to absorb hydrocarbons and water, forming an emulsion. The emulsion, along with any other liquids, remain in the washing barrel 12 and dilute untreated waste as it enters the washing barrel. At a point approximately one-third the length of the washing barrel 12, from the washing barrel lower end, a pump 30 draws liquid from the washing barrel for controlling the liquid volume in the washing barrel. Drawn-off liquid passes through a filtering device 32 for removing residual, and/or particulate matter ("fines"), prior to flowing through the pump 30. The filtering device 32 may employ any conventional filtering techniques for removing solid matter from the liquid, such as a settlement vessel, backflush filter, cyclone filter, bagging, and etc.

After filtration, drawn-off liquid passes through the pump 30 and through the electric immersion heater 16, which is of conventional type. The heater 16 raises the temperature of the liquid passing through it to approximately 235 degrees to 295 degrees Fahrenheit, with the temperature of the liquid being ideally raised to about 265 degrees Fahrenheit. At this temperature, any water, washing medium, and lighter hydrocarbons in the liquid substantially vaporize. Any remaining liquid, after passing through the heater 16, is substantially composed of heavier hydrocarbons.

The vaporization vessel 18 draws vapors from the electric immersion heater 16, as well as any remaining liquid. The vaporization vessel 18 forms a shape corresponding generally to a cylindrical tank having hemispherical ends. The vaporization vessel 16 is oriented substantially vertically, with vapors and liquid from the electric immersion heater 16 entering the upper end of the vessel. A vacuum pump 34 also connects to the upper end of the vaporization vessel 18. The vacuum pump 34 operates in the range from 14 to 18 inches of mercury for creating a negative pressure in the vaporization vessel 18. The negative pressure results in a flow of vapors and liquid from the electric immersion heater 16 into the vaporization vessel 18.

Liquids, which are mainly heavier hydrocarbons, settle on the bottom of the vaporization vessel 18. A pump 36 draws this liquid from the bottom of the vaporization vessel 18 and injects it into to the recovered hydrocarbon vessel 20 for storage prior to recycling. More particularly, liquid collected in the recovered hydrocarbon vessel 20 is preferably recycled as a commercially valuable petroleum product. Liquid from the recovered hydrocarbon vessel 20 may be collected by any conventional method for recycling, such as by vacuum truck, pumping, or other methods.

The vacuum pump 34 is of conventional design, and is preferably a conventional, liquid ring vane type. Vapors flow from the upper end of the vaporization vessel 18 into the vacuum pump 34, which cools and condenses the vapors.

A condenser 38 of conventional design, is connected to the vacuum pump 34 and provides cooling. The condenser 38 is preferably a fin-fan type, i.e., employs a plurality of fins for radiating heat away, along with a fan for drawing air across the fins. Another pump 40 draws condensed vapors, i.e., liquid, from the vacuum pump 34, and returns the liquid to the storage container 26 holding the washing medium. Thus, condensed vapors are recycled as water-miscible washing medium for washing additional waste.

The previously mentioned drying drum 14 receives solids from the washing barrel 12 and dries them. The drying drum 14 forms an enclosed, generally cylindrical shape, and includes an internal screw conveyor. The screw conveyor mounts coaxially within the drying drum, and extends for approximately the entire length of the drying drum. As the screw conveyor slowly rotates, solids from the washing barrel 12 enter one end of the drying drum 14. The rotation conveys the solids to the opposite end of the drying drum 14 while heating is applied. Preferably, the heating raises the temperature within the drying drum to approximately 235 to 295 degrees Fahrenheit, with the temperature being ideally raised to about 265 degrees Fahrenheit. At this temperature, as previously discussed, water, washing medium, and lighter hydrocarbons substantially vaporize. Solids thus reach the opposite end of the drying drum 14 via the internal screw conveyor, substantially free of water, washing medium, and lighter hydrocarbons. At the "dry end" of the drying drum 14, the solids fall through a rotary valve 42 and exit the drying drum.

Solids enter the drying drum 14 through a generally vertical pipe or conduit 44 connecting the washing barrel 12 to the drying drum. More particularly, the entry end of the drying drum 14 is positioned below the upper end of the washing barrel 12. Under the influence of gravity, solids fall from the washing barrel 12 through the conduit 42 into the end of the drying drum 14. The conduit 42 may additionally include a screw conveyor, agitator, conveyor belt, or other mechanism for urging solids into the drying drum 14.

The vacuum pump 34 also connects to the drying drum 14. Vapors from the drying drum 14 flow into the vacuum pump 34. As previously discussed in connection with the vaporization vessel 18, the vacuum pump 34 and condenser, cool and condense such vapors. Also as previously discussed, a pump 40 draws condensed vapors, i.e., liquid, from the vacuum pump 34, pumps it through the condenser, and returns the liquid to the storage container 26 holding the washing medium. Vapors from the drying drum 14 are thus recycled as water-miscible washing medium for washing additional waste.

Vapors in the first major processing step are hence condensed and recycled as water-miscible washing medium for washing incoming waste. Due to such recycling, over a period of time the washing medium in the storage container 26 can become diluted. When treating waste resulting from the refinement of crude oil (e.g., sludge from American Petroleum Institute ("API") separators, tank bottoms, and other equipment), the dilution will be substantially from water, i.e., no lighter hydrocarbons will be present. (Prior petroleum and/or chemical processing has heated such waste to a degree that lighter hydrocarbons have been previously removed). For preventing, or removing accumulation of water from the washing medium due to recycling, the first major processing step may additionally include distillation of condensed vapors for separating water from the washing medium. Separated water at this stage is essentially contamination free and may be reintroduced into the environment, such as be sewering.

When treating waste in the form of soils contaminated by a spill of raw crude oil, or refined petroleum products such as gasoline, JP-4, JP-5, diesel, or solvents, the waste will generally include significant amounts of lighter hydrocarbons. In such situations, the first major processing step includes a low-temperature distillation of these condensed vapors. Specifically, condensed vapors are subsequently heated to 180 to 190 degrees Fahrenheit, which vaporizes lighter hydrocarbons, but not water. These vapors are collected and recondensed via a vacuum pump, and then recycled as a commercially valuable petroleum product.

This substantially completes the description of the first major processing step of the recycling system. As noted earlier, this processing step principally functions to separate water and hydrocarbons from solids, with the focus being on separating water and lighter hydrocarbons. Accordingly, if the waste does not contain at least one to two percent water by weight, or significant amounts of lighter hydrocarbons, the first processing step is preferably omitted.

Figure 2:
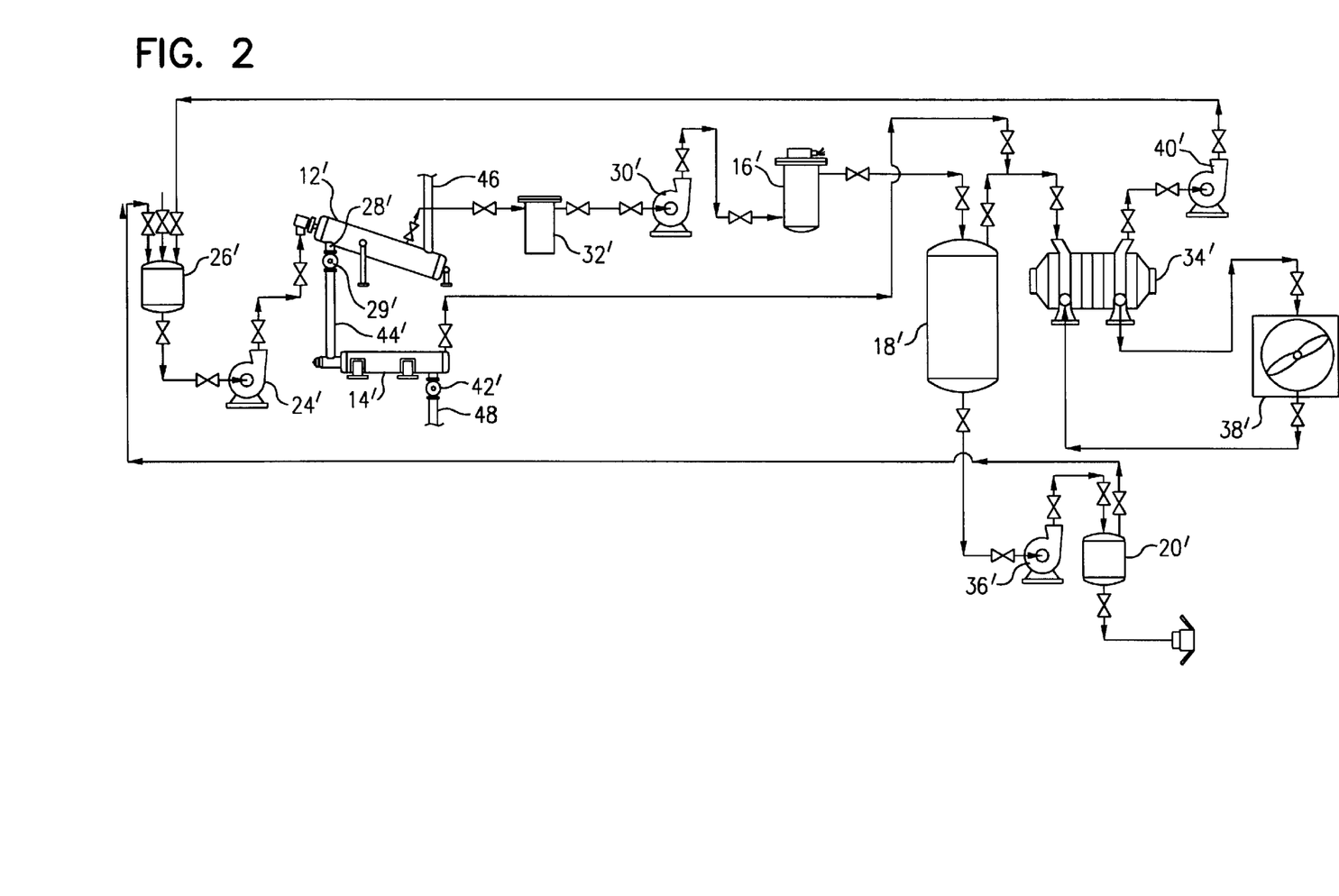

Solids from the first major processing step are further treated in the second major processing step for substantially functioning to remove residual hydrocarbons from the solid material. FIG. 2 illustrates apparatus for carrying out the second major processing step. With one principal difference, the second processing step, and apparatus for carrying out the process is substantially identical to that of the first major processing step. Identical reference numerals are therefore used in FIGS. 1 and 2 to indicate substantially identical, corresponding components, with the prime symbol (') following reference numerals in FIG. 2. Reference numerals followed by the prime symbol ('), thus designate components for carrying out the second major processing step.

The principal difference between the first and second major processing steps, is that the second major processing step employs a washing medium that is nonmiscible with water, and is a solvent to hydrocarbons. This nonmiscible washing medium is composed of d-limonene (chemical formula $C_{10}H_{16}$). d-limonene is non-petroleum based, and is manufactured from organic materials, such as orange peels, grapes peels, and/or dill, for example. d-limonene is manufactured by, and available from, the Florida Chemical Company of Winterhaven, Fla., and other organic chemical manufacturers.

Solids from the drying drum 14 of the first major processing step enter the washing barrel 12' of the second major processing step. The solids, with hydrocarbons and toxic/RCRA metals, enter this washing barrel 12' through a generally vertical pipe or conduit 46. More particularly, the lower, or entry end of the washing barrel 12' of the second major processing step is positioned below the exit end of the drying drum 14 of the first major processing step. The conduit 46 connects these two ends to one another. Under the influence of gravity, dried solids fall through the conduit 46, and through a rotary valve into the washing barrel 12' of the second major processing step. The conduit 46 may additionally include a screw conveyor, agitator, conveyor belt, or other mechanism for urging these solids into the washing barrel 12'. Solids collected by the filtering device 32 of the first major processing step (see FIG. 1), are preferably incorporated with the dried solids entering the washing barrel 12' of the second major processing step.

With the exception of a different washing medium, the washing barrel 12' operates substantially the same as the washing barrel 12 of the first major processing step. Namely, a pump 24' injects the washing medium as needed into the washing barrel 12' from a closed storage container 26' holding the washing medium. The washing medium is injected into the washing barrel 12' through channels in the agitation device of the washing barrel. An amount of washing medium is preferably injected into the washing barrel 12' to achieve an overall mixture having a standard pH measurement in the range 7.5 to 8.5, with the pH being most preferably about 8.0±0.2.

The washing medium, d-limonene, which is nonmiscible with water as previously noted, acts as both a wetting and a dispersing agent, and as a solvent for hydrocarbons. For enhancing hydrocarbon solvent ability, heating is applied. Preferably, heating maintains the temperature of the mixture within the washing barrel 12' in the range of 130 to 150 degrees Fahrenheit, with the temperature ideally being maintained at about 140 degrees Fahrenheit. Proper temperature in the washing barrel 12' is preferably maintained by heating the washing medium prior to injection into the washing barrel, such that the resulting mixture is within the proper temperature range.

As the second major processing step is substantially the same as the previously described first major processing step, only a brief description of the remainder of the second major processing step is provided. In that regard, agitation in the washing barrel 12' of the second major processing step results in hydrocarbons separating from the solids. Specifically, the hydrocarbons dissolve into the washing medium, while rotation of the agitation device, due to the screw conveyor shape, carries separated solids to the upper end of the washing barrel 12'. At the upper end of the washing barrel 12', the solids fall through a drop-out point 28' via gravity overflow, and through a rotary valve 29' and conduit 44' into a drying drum 14'.

At a point approximately one-third the length of the washing barrel 12', from the washing barrel lower end, a pump 30' draws liquid from the washing barrel for controlling the liquid volume in the washing barrel. Drawn-off liquid passes through a filtering device 32' for removing residual, and/or particulate solid matter ("fines"), prior to flowing through the pump 30'. The liquid at this processing stage is composed substantially of only washing medium and hydrocarbons.

After filtration, drawn-off liquid passes through the pump 30' and through an electric immersion heater 16'. The heater 16' raises the temperature of the liquid passing through it to approximately 235 degrees to 295 degrees Fahrenheit, with the temperature of the liquid being ideally raised to about 265 degrees Fahrenheit. A vaporization vessel 18' draws vapors from the electric immersion heater 16', as well as any remaining liquid, via operation of a vacuum pump 34' connected to the upper end of the vessel. Liquids, which are mainly heavier hydrocarbons, settle on the bottom of the vaporization vessel 18'. A pump 36' draws this liquid from the bottom of the vaporization vessel 18' and injects it into to the recovered hydrocarbon vessel 20' for storage prior to recycling.

Vapors flow from the upper end of the vaporization vessel 18' into the vacuum pump 34', which cools and condenses the vapors. Another pump 40' draws condensed vapors, i.e., liquid, from the vacuum pump 34', and returns the liquid to the storage container 26' holding the washing medium. The liquid is composed substantially only of the washing medium, d-limonene, and is therefore recyclable for washing additional solids from the first processing step.

The drying drum 14' receives solids from the washing barrel 12', and conveys the solids through the drum via internal screw conveyor. During the conveyance of the solids, the drying drum 14' applies heat to raise the temperature in the drum to approximately 235 to 295 degrees Fahrenheit, with the temperature ideally being 265 degrees Fahrenheit. At the "dry end" of the drying drum 14', the solids fall through a rotary valve 42' and exit the drying drum.

The vacuum pump 34' also connects to the drying drum 14', and captures vapors from the drying drum. As previously discussed, the vacuum pump 34', along with a condenser, cools and condenses such vapors. Also as previously discussed, a pump 40' draws condensed vapors, i.e., liquid, from the vacuum pump 34', and returns the liquid to the storage container 26' holding the washing medium. Vapors from the drying drum 14' are thus recycled as washing medium for washing additional solids from the first processing step.

Figure 3:
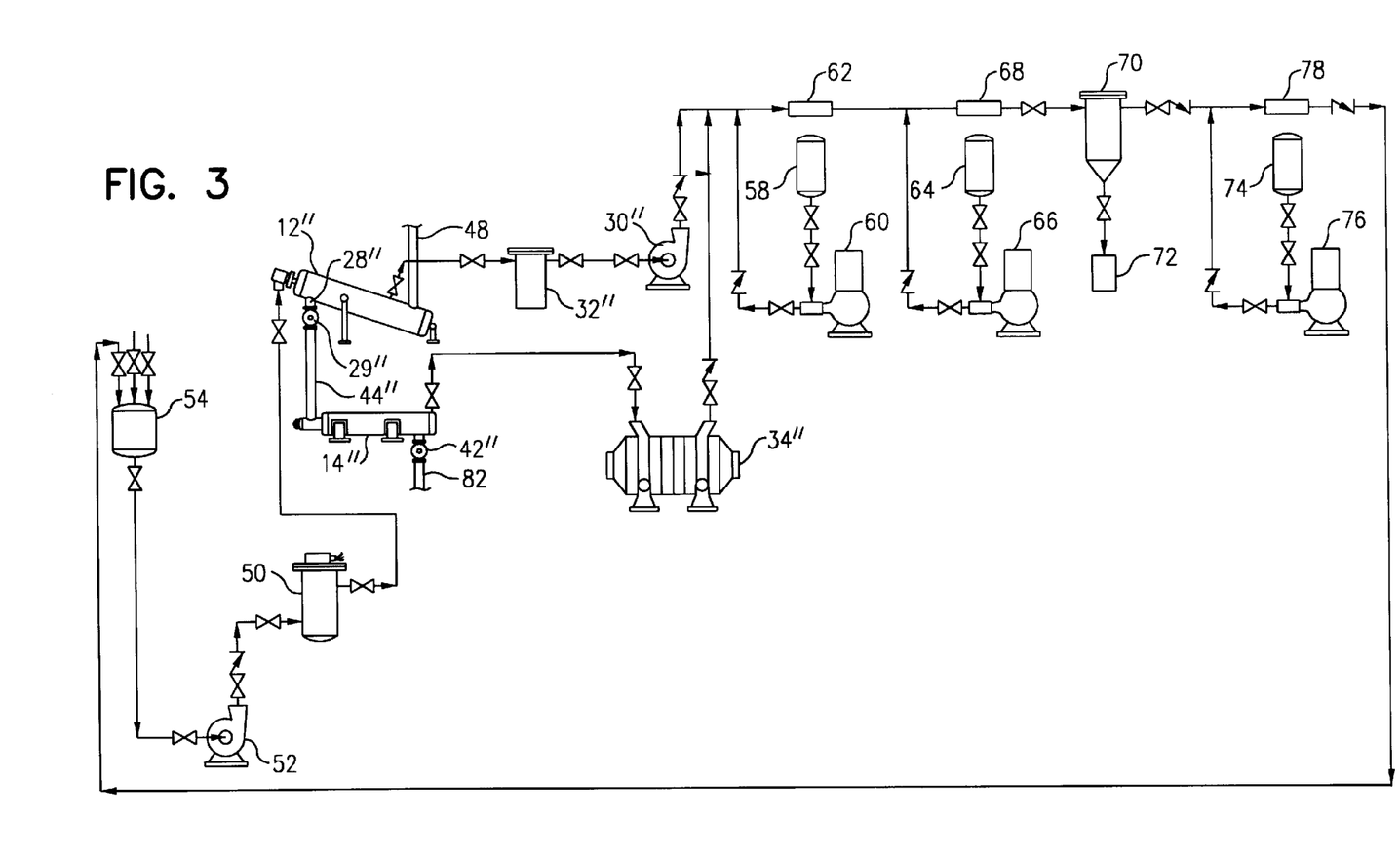

Solids from the second major processing step are further treated in the third major processing step for separating metals from this solid matter. At this stage, the solids include virtually no hydrocarbons or water due to prior processing steps. FIG. 3 illustrates apparatus for carrying out the third major processing step.

Several components in the apparatus for the third major processing step are identical in structure and operation to components of the apparatus for the first and second major processing steps illustrated in FIGS. 1 and 2. Reference numerals identical to those used in FIGS. 1 and 2 are used in FIG. 3 to indicate some of these substantially identical components, with a double prime symbol (") following such reference numerals in FIG. 3. Reference numerals followed by the double prime symbol ("), therefore designate components for carrying out the third major processing step.

Solids from the drying drum 14' of the second major processing step enter a washing barrel 12" of the third major processing step. The solids enter this washing barrel 12" through a generally vertical pipe or conduit 48. More particularly, the lower, or entry end of the washing barrel 12" of the second major processing step is positioned below the exit end of the drying drum 14' of the second major processing step. The conduit 48 connects these two ends to one another. Under the influence of gravity, dried solids fall through the conduit 48, and through a rotary valve into the washing barrel 12" of the third major processing step. The conduit 48 may additionally include a screw conveyor, agitator, conveyor belt, or other mechanism for urging these solids into the washing barrel 12'. Solids collected by the filtering device 32' of the second major processing step (see FIG. 2), are preferably incorporated with the dried solids entering the washing barrel 12" The of the third major processing step.

The washing barrel 12" is substantially identical in structure and operation to the washing barrels 12 and 12' of the first and second major processing steps, with two primary differences. Namely, a relatively strong acid is used for the washing medium, and the temperature in the washing barrel 12" is raised to a significantly greater temperature. In this regard, the washing medium is preferably composed of sulfuric acid, hydrochloric acid, or nitric acid, with sulfuric acid (chemical formula $H_2SO_4$) being the most preferred. Preferably, this acidic washing medium is injected into the washing barrel 12" through the washing barrel agitation device in an amount sufficient to result in a mixture of acid and solids having a standard pH measurement in the range 1.5 to 3.5. Most preferably, an amount of acidic washing medium is injected to the washing barrel 12" to achieve a pH of approximately 2.0±0.2.

Heating is applied such that the temperature of the mixture in the washing barrel 12" has a temperature of approximately 200 to 210 degrees Fahrenheit. Proper temperature is preferably achieved by heating the washing medium prior to injection into the washing barrel 12", using a conventional electric immersion heater 50 as shown in FIG. 3. More particularly, a pump 52 draws washing medium from a storage container 54, and forces the washing medium through the immersion heater 50 for heating, prior to injection into the washing barrel 12", such that the resulting mixture is within the proper temperature range.

Agitation, combined with the acidity and temperature, function to dissolve any metals in the solids. Undissolved solids travel to the upper end of the washing barrel 12" due to the screw-conveyor shape and rotation of the agitation device. The undissolved solids contain substantially no toxic/RCRA metals as any metals have dissolved into the washing medium At the upper end of the washing barrel 12", these solids fall through a drop-out point 28" via gravity overflow. Thereafter, the solids fall through a rotary valve 29" and conduit 44" into a drying drum 14".

At a point approximately one-third the length of the washing barrel 12", from the washing barrel lower end, a pump 30" draws liquid from the washing barrel for controlling the liquid volume in the washing barrel. The liquid, containing dissolved metals, passes through a filtering device 32" for removing residual, and/or particulate solid matter ("fines"), prior to flowing through the pump 30". Dissolved metals pass through the filtering device 32" as ions dissolved in solution. That is, the filtering device 32" removes only undissolved solid matter, which does not include metals.

After filtration, the liquid passes through the pump 30" and combines with a hydroxide solution, preferably sodium hydroxide (chemical formula NaOH). As shown in FIG. 3, the apparatus includes a storage vessel 58 containing sodium hydroxide, connected to a pump 60. This pump 60 injects the sodium hydroxide into the line through which the liquid containing dissolved metals is flowing. A conventional in-line mixer 62 thereafter thoroughly mixes the sodium hydroxide with the liquid containing dissolved metals. An amount of sodium hydroxide is mixed with the liquid containing dissolved metals to result in a mixture having a standard pH measurement in the range 9.0 to 10.0, with the pH being ideally 9.5±0.2. At this stage, the dissolved metals remain in solution.

Next, a sulfate solution is added. Preferably, the sulfate solution is composed substantially of aqueous ferrous sulfate, aluminum sulfate, cupric sulfate or ferric sulfate, with ferrous sulfate ($FeSO_4$) being the most preferred for cost effectiveness. In this regard, the apparatus includes a storage vessel 64 containing ferrous sulfate, connected to a pump 66. This pump 66 injects the ferrous sulfate solution into the solution containing dissolved metals. Thereafter, a conventional in-line mixer 68 provides through mixing. The mixing with ferrous sulfate causes the dissolved metals to combine as positive and negative ions and flocculate crystals. Specifically, the metals precipitate out of solution in the form of substantially nontoxic chemical compounds, such as salts, oxides, sulfates, and silicates.

Subsequently, the solution passes through a filtering device 70, which preferably is a conventional backflush filter. The filtering device 70 removes the metal containing chemical compounds from the solution as solid particulate. The removed metals are collected in a container 72 connected to the filtering device 70, for appropriate disposal.

Liquid that has passed through the filtering device 70, combines with the acid composing the acidic washing medium, which is preferably sulfuric acid. As shown in FIG. 3, the apparatus includes an additional vessel 74 containing the acid composing the acidic washing medium, and connected to a pump 76. This pump 76 injects the acid into the liquid flowing from the filtering device 70. A conventional in-line mixer 78 thereafter provides through mixing. An amount of acid is used, such that the resulting solution has approximately the same pH as the acidic washing medium. (To achieve a pH equal to the acidic washing medium, generally a stronger concentration of acid than that of the acidic washing medium must be used). Thereafter, the liquid returns to the storage container 54 holding the acidic washing medium, and thus is recycled.

The drying drum 14" is substantially identical in structure and operation to the drums 14 and 14' of the first and second processing steps. In this regard, the drying drum 14" of the present processing steps conveys solids through the drum via internal screw conveyor, while applying heat. The heat evaporates moisture from the solids. At the "dry end" of the drying drum 14", the solids fall through a rotary valve 42" and exit the drying drum.

A vacuum pump 34" connects to the drying drum 14" and draws vapors from the drying drum. The vacuum pump 34", along with a condenser, cools and condenses the vapors, and injects the condensed vapors, i.e., liquid, into the liquid drawn from the washing barrel 12". In particular, the vacuum pump 34" injects the condensed vapors into the liquid drawn from the washing barrel 12" after it has been filtered, but prior to the injection of the hydroxide solution. The condensed vapor is composed substantially of the washing medium, and thus condensed vapors are also recycled. (A condenser, not shown in FIG. 3, substantially identical to the condensers 38 and 38' of the first and second major processing steps as shown in FIGS. 1 and 2, connects to the vacuum pump 34" for providing cooling).

Figure 4:
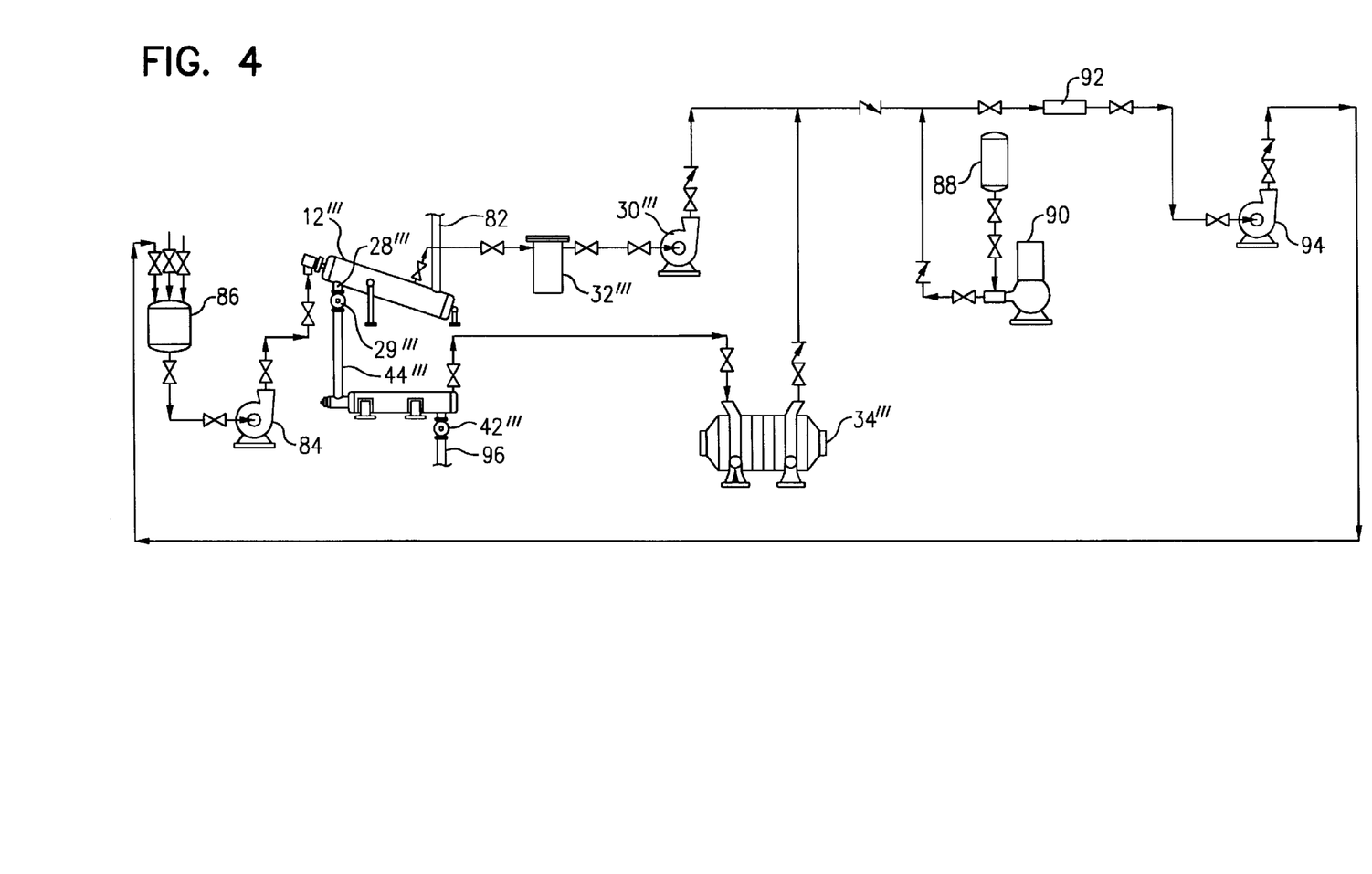

Solids from the third major processing step are further treated in the fourth major processing step for neutralizing acidity. FIG. 4 illustrates apparatus for carrying out the fourth major processing step.

Several components in the apparatus for the fourth major processing step are identical in structure and operation to components of the apparatus for the first, second, and third major processing steps illustrated in FIGS. 1 through 3. Reference numerals identical to those used in FIGS. 1 through 3 are used in FIG. 4 to indicate some of these substantially identical components, with a triple prime symbol (''') following such reference numerals in FIG. 4. Reference numerals followed by the triple prime symbol ('''), therefore designate components for carrying out the fourth major processing step.

Solids from the drying drum 14" of the third major processing step enter a washing barrel 12''' of the fourth major processing step. The solids enter this washing barrel 12''' through a generally vertical pipe or conduit 82. More particularly, the lower, or entry end of the washing barrel 12''' of the fourth major processing step is positioned below the exit end of the drying drum 14" of the third major processing step. The conduit 82 connects these two ends to one another. Under the influence of gravity, dried solids fall through the conduit 82, and through a rotary valve into the washing barrel 12''' of the fourth major processing step. The conduit 82 may additionally include a screw conveyor, agitator, conveyor belt, or other mechanism for urging these solids into the washing barrel 12". Solids collected by the filtering device 58 of the third major processing step (see FIG. 3), are preferably incorporated with the dried solids entering the washing barrel 12''' of the fourth major processing step.

The washing barrel 12''' is substantially identical in structure and operation to the washing barrels 12, 12' and 12" of the first, second, and third major processing steps, with two principal differences. Namely, a relatively strong alkaline solution is used for the washing medium, and heating is not applied. In this regard, the washing medium is preferably a hydroxide solution, ideally sodium hydroxide. Preferably, the washing medium has a standard pH measurement in the range 9.0 to 10.0, with the pH being most preferably 9.5±0.2. Sufficient washing medium is injected into the washing barrel 12''' to achieve a resulting mixture having a pH of approximately 7.0. A pump 84 draws washing medium from a storage container 86 and injects the washing medium through channels in the agitation device of the washing barrel 12'''.

Solids travel to the upper end of the washing barrel 12''' due to the screw-conveyor shape and rotation of the agitation device. The solids contain substantially no metals and/or hydrocarbons due to removal by prior processing steps. At the upper end of the washing barrel 12''', these solids fall through a drop-out point 28''' via gravity overflow. Thereafter, the solids fall through a rotary valve 29''' and conduit 44''' into a drying drum 14''' for removing moisture as required to meet landfill specifications.

At a point approximately one-third the length of the washing barrel 12''', from the washing barrel lower end, a pump 30''' draws liquid from the washing barrel for controlling the liquid volume in the washing barrel. The liquid passes through a filtering device 32''' for removing residual, and/or particulate solid matter ("fines"), prior to flowing through the pump 30'''.

After filtration, the liquid passes through the pump 30''' and combines with the alkaline solution composing the washing medium, which is preferably sodium hydroxide. As shown in FIG. 4, the apparatus includes an additional vessel 88 containing the hydroxide solution composing the alkaline washing medium, and connected to a pump 90. This pump 90 injects the hydroxide solution into the liquid flowing from the other pump 30'''. A conventional in-line mixer 92 thereafter provides through mixing. An amount of hydroxide solution is used, such that the resulting solution has approximately the same pH as the washing medium. (To achieve a pH equal to the alkaline washing medium, generally a stronger concentration of hydroxide solution than that of the washing medium must be used). Thereafter, a pump 94 returns the liquid to the storage container 86 holding the washing medium, and thus is recycled.

The drying drum 14''' is substantially identical in structure and operation to the drums 14, 14' and 14" of the first, second, and third processing steps. In this regard, the drying drum 14''' of the present processing steps conveys solids through the drum via internal screw conveyor, while applying heat. The heat evaporates moisture from the solids. At the "dry end" of the drying drum 14''', the solids fall through a rotary valve 42''' and exit the drying drum.

A vacuum pump 34''' connects to the drying drum 14''' and draws vapors from the drying drum. The vacuum pump 34''', along with a condenser, cools and condenses the vapors, and injects the condensed vapors, i.e., liquid, into the liquid drawn from the washing barrel 12'''. In particular, the vacuum pump 34''' injects the condensed vapors into the liquid drawn from the washing barrel 12''' after it has been filtered, but prior to the injection of the hydroxide solution. The condensed vapor is composed substantially of the washing medium, and thus condensed vapors are also recycled. (A condenser, not shown in FIG. 4, substantially identical to the condensers 38 and 38' of the first and second major processing steps as shown in FIGS. 1 and 2, connects to the vacuum pump 34'' for providing cooling).

Solids exit the drying drum 14''' through a pipe or conduit 96, which may include a screw conveyor, agitator, conveyor belt, or other mechanism for facilitating the exit of the solids. At this stage, the solids contain substantially no water, hydrocarbons, or toxic metals, and may be appropriately disposed of, such as in a landfill for example. Moisture content of the solids exiting the drying drum 14''' may be controlled by adjusting the temperature in the drying drum and/or conveyance speed of solids through the drum for meeting landfill specifications.

As can be seen from the foregoing description, the present invention provides a number of advantages. For example, petroleum-based washing mediums are not employed. In this regard, the first and second major processing steps employ non-environmentally hazardous, non-petroleum based, washing mediums. In comparison, some prior recycling systems employ petroleum-based solvents for removing hydrocarbons from waste. The problem, though, is that these petroleum-based solvents are generally volatile, and environmentally hazardous.

The present recycling system prevents vapors from escaping by maintaining a negative pressure in the system, and using rotary valves for entry and exit of solid materials from components of the system. Processing in accordance with the recycling system, results in condensation of vapors, and recycling of the washing mediums. Additionally, this processing results in separated water and soil particulate (solids) substantially free of contamination by hydrocarbons and/or toxic metals, and thus may be appropriately disposed of. For example, the water may be sewered, and the soil particulate disposed of in a landfill, or used on site.

With respect to the apparatus for carrying out all of the major processing steps, this apparatus employs where possible, components of conventional design for cost effectiveness. Thus, conventional valves, containers, vessels, pumps, conveyors, and etc. are used where possible and commercially practicable. With regard to pumps, the system preferably employs conventional seal-less, magnetically driven pumps for improved life. More particularly, the liquid being pumped will frequently include solid particulate ("fines"), that shorten the operational life of pumps having seals, and thus seal-less pumps are preferred.

Referring to FIGS. 1–4, the apparatus includes numerous one-way flow valves ("check valves"), of conventional design, that were not discussed previously. These one-way flow valves are used to ensure flow of materials from one component to another, in the proper direction in the disclosed apparatus.

While the preferred embodiment of the invention has been illustrated and described, it will be appreciated that various changes can be made therein while remaining within the scope of the invention. For example, an additional processing step could be for dealing with waste containing substantial liquid. Specifically, such waste could be first subjected to centrifuging to significantly separate liquid material from solid material, for more efficient recycling of the waste. Additionally, centrifuging could be used instead of filtering for removing residual solid particulate ("fines") from liquids. Moreover, conveyance mechanisms could be used to transport solids from one major processing step to another, such that generally vertical conduits are not required, i.e., horizontal or sloped conduits could be used. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A recycling system for treating petrochemical types of hazardous waste, the recycling system comprising the steps of:
   (a) mixing the hazardous waste with a water-miscible washing medium, and agitating the mixture for separating solids;
   (b) removing hydrocarbons from separated solids by mixing separated solids with a washing medium that is nonmiscible with water, and agitating the mixture for dissolving hydrocarbons from solids;
   (c) removing metals from separated solids by mixing separated solids with an acidic washing medium, and agitating the mixture for dissolving metals from separated solids into liquid solution; and
   (d) subjecting separated solids to an alkaline washing solution for neutralizing acidity in separated solids, and thereafter drying separated solids for removal of moisture for disposal of separated solids.

2. The recycling system of claim 1, wherein the water-miscible washing medium comprises citric acid.

3. The recycling system of claim 1, wherein the hazardous waste is mixed with the water-miscible washing medium in an amount sufficient to result in a mixture having a standard pH measurement in the range from 7.5 to 8.5.

4. The recycling system of claim 1, wherein the step of mixing the hazardous waste with a water-miscible washing medium, includes the substep of applying heat to ensure the resulting mixture has a temperature of at least 130 degrees Fahrenheit.

5. The recycling system of claim 1, wherein the washing medium that is nonmiscible with water, comprises d-limonene.

6. The recycling system of claim 1, wherein the acidic washing medium comprises an acid selected from the group consisting of sulfuric acid, hydrochloric acid, and nitric acid.

7. A recycling system for treating soil contaminated with toxic metals for disposal of the soil, the recycling system comprising the steps of:
   (a) mixing the soil with an acidic washing medium to form a mixture having a standard pH measurement of no greater than 2.5 for causing metals to dissolve from the soil;
   (b) applying heat to ensure the mixture has a temperature of at least 200 degrees Fahrenheit for enhancing the dissolving of metals;
   (c) agitating the mixture resulting from the step of heating for further enhancing the dissolving of metals; and
   (d) separating soil and liquid from one another in the mixture resulting from the heating and agitating steps, and thereafter subjecting separated soil to an alkaline washing solution for neutralizing acidity in the soil, and thereafter drying the soil for disposal.

8. The recycling system of claim 7, following the step of separating soil and liquid from one another, further comprising the steps of:
   (a) mixing a hydroxide solution with separated liquid in an amount sufficient to form an alkaline solution;
   (b) mixing a sulfate with the alkaline solution for causing dissolved metals in the solution to precipitate out of solution in the form of chemical compounds; and
   (c) filtering the alkaline solution to capture the chemical compounds.

9. The recycling system of claim 8, wherein the hydroxide solution comprises sodium hydroxide.

10. The recycling system of claim 9, wherein the sulfate comprises a sulfate selected from the group consisting of aluminum sulfate, ferric sulfate, ferrous sulfate, and cupric sulfate.

11. The recycling system of claim 7, wherein the acidic washing medium comprises an acid selected from the group consisting of sulfuric acid, hydrochloric acid and nitric acid.

12. The recycling system of claim 7, wherein the step mixing the soil with an acidic washing medium forms a mixture have a standard pH measurement in the range from 1.5 to 2.5.

13. The recycling system of claim 7, wherein the alkaline washing solution has standard pH measurement no less than 8.5.

14. The recycling system of claim 7, wherein the step of applying heat results in the mixture having a temperature no greater than 210 degrees Fahrenheit.

15. A recycling system for treating soil contaminated with petrochemical types of hazardous waste, the recycling system comprising the steps of:
   (a) removing hydrocarbons from the soil by mixing the soil with d-limonene, and agitating the resulting mixture for dissolving hydrocarbons in the soil;
   (b) separating soil from liquid in the mixture resulting from the step of removing hydrocarbons, and if the contamination includes toxic metals, performing the substeps of:
      (i) mixing and agitating the soil with an acidic washing medium for dissolving metals from the soil into liquid solution;
      (ii) subjecting the soil to an alkaline washing solution for neutralizing acidity in the soil; and
   (c) drying the soil for removing moisture for disposal of the soil.

16. The recycling system of claim 15, wherein the step of removing hydrocarbons from the soil, includes applying heat to ensure the resulting mixture has a temperature of at least 130 degrees Fahrenheit.

17. The recycling system of claim 15, wherein the step of removing hydrocarbons from the soil, includes controlling the amount of d-limonene mixed with the soil such that the resulting mixture has a standard pH measurement in the range from 7.5 to 8.5.

18. The recycling system of claim 15, wherein the acidic washing medium comprises an acid selected from the consisting of sulfuric acid, hydrochloric acid and nitric acid.

19. The recycling system of claim 15, wherein the substep of mixing and agitating the soil with an acidic washing medium includes applying heat to ensure the resulting mixture has a temperature of at least 200 degrees Fahrenheit.

20. The recycling system of claim 15, wherein the substep of mixing and agitating the soil with an acidic washing medium includes controlling the amount of the acidic washing medium mixed with the soil such that the resulting mixture has a standard pH measurement in the range from 1.5 to 2.5.

* * * * *